Aug. 11, 1964   J. M. ALDERSON   3,143,852
RAM JET ENGINE

Filed Sept. 8, 1961   3 Sheets-Sheet 3

INVENTOR
John M. Alderson

BY Moore & Hall

ATTORNEYS

United States Patent Office 3,143,852
Patented Aug. 11, 1964

3,143,852
RAM JET ENGINE
John M. Alderson, 22592 Alessandro Blvd.,
Savannah, Ga.
Filed Sept. 8, 1961, Ser. No. 136,908
12 Claims. (Cl. 60—35.6)

This invention relates to ram jet engines and more particularly to methods and means employed in connection with the ram jet for providing greater thrust, when the engine is at rest or operating at slow speed, than heretofore attained.

While ram jet engines have long been known, they have had a serious drawback in that they have had only small thrust when at rest or when operating at low speeds and therefore have not been useful in connection with aircraft or other moving vehicles. It is an object of my invention to overcome the aforesaid defect.

It is another object of my invention to provide means for enabling a ram jet engine to be re-ignited in event of flameout.

Still another object of my invention is to provide a ram jet engine suitable for use on aircraft.

Another object of my invention is to provide means for controlling a craft, driven by a ram jet engine, to limit its speed when desired.

Yet another object of the invention is to reduce the speed of a craft driven by a ram jet engine when desired; for example, in the case of an aircraft, when the aircraft is ready to land.

Other objects and advantages of the invention will appear as this description proceeds.

In carrying out the invention in its preferred form, I provide a ram jet engine with an air intake scoop having a variable orifice at its small end. This orifice operates in connection with an iris diaphragm so that the front end of the combustion chamber is practically closed when the engine is standing still or is moving forward at a very low rate of speed. Under these conditions the orifice which admits air into the combustion chamber is small. This provides a large area at the forward end of the combustion chamber for receiving the thrust which will propel the aircraft in a forward direction. As the engine picks up speed, the orifice of said cone as well as the iris diaphragm opens gradually until finally at normal flying speed the iris diaphragm and orifice are wide open, thereby providing a large opening for air to enter. In this circumstance the area of the forward end of the combustion chamber, available for receiving the thrust, has decreased.

Means are provided to close the orifice and iris diaphragm forcibly, at the will of the pilot, so that in event of flame-out the fuel may be re-ignited.

Suitable means are provided in the tail pipe of the engine for moving baffles into the path of the burnt gases to deflect the same and reduce the thrust, whereby the speed of the aircraft may be decreased for purposes of making a landing.

While in the drawings and in the following description, only an engine per-se is shown and described, it is understood that the engine is to be mounted on an aircraft, land vehicle, boat, or other craft. When mounted on an aircraft it is to be located in the same place that a conventional jet engine is located, and therefore the specific way of mounting this new engine need not be shown or further described.

Figure 1:
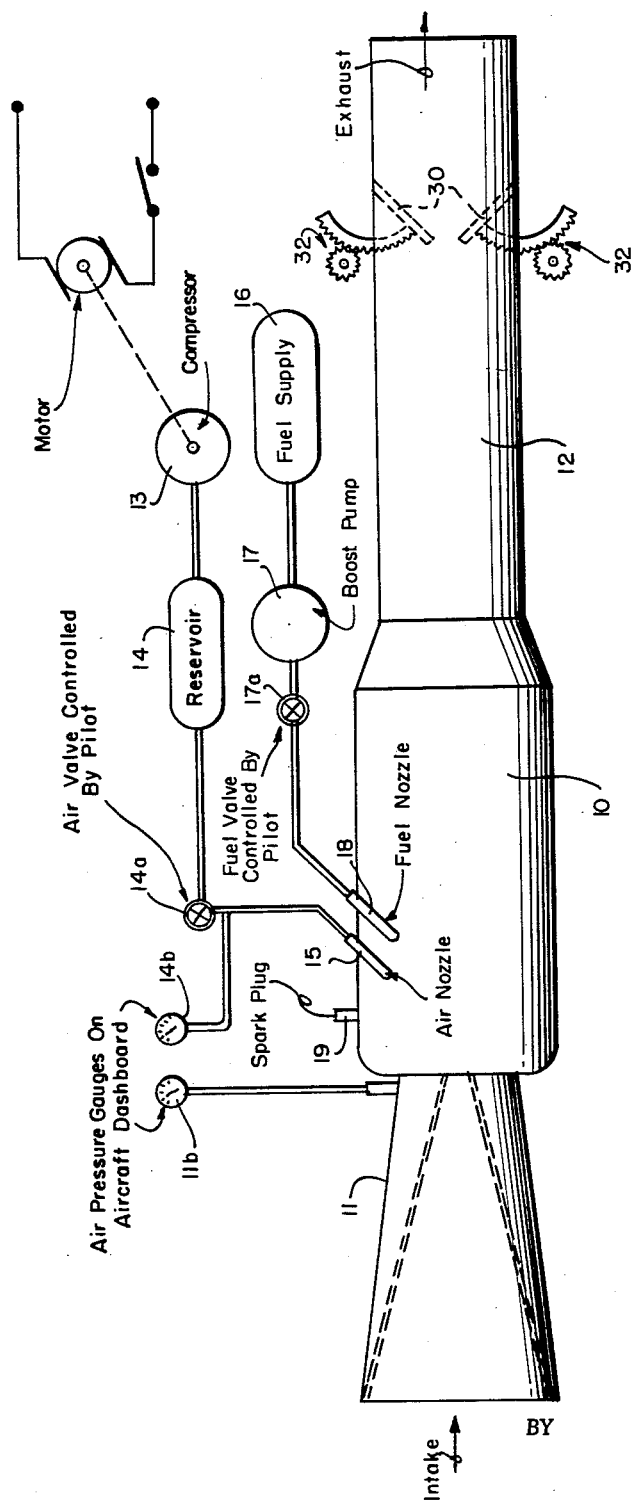
FIGURE 1 is a side view of a device incorporating the invention.

In the drawings, the engine comprises a combustion chamber 10 having an outer air intake cone 11 and a tail pipe 12. In order to provide air for starting the engine, when it is at rest, an air compressor 13 driven by a suitable electric motor is provided and it supplies air under pressure to a reservoir 14. The compressor is of the usual type having a regulating device which senses the pressure in the reservoir and starts the electric motor when the pressure in the reservoir falls below a preset value, and de-energizes the motor when the pressure in the reservoir attains the pre-set value. Air from the reservoir is furnished to the nozzle 15 when it is desired to start from rest. Fuel of any suitable type, stored in tank 16, is fed by pump 17 to the fuel nozzle 18, and ignition is accomplished by means of suitable spark plugs 19. Any suitable means under the control of the pilot may be employed to control the delivery of the fuel, the compressed air, and the energization of the spark plugs 19. For example, air valve 14a and fuel valve 17a which may be controlled manually by the pilot are provided. Suitable air pressure meters 11b and 14b are located on the dashboard and give the pilot information helpful in enabling him to adjust the valves 14a and 17a. Meter 11b is subject to the pressure of the air scooped up into flexible air line 11a which terminates at its forward end at inner cone 21, hereinafter described.

Figure 2:
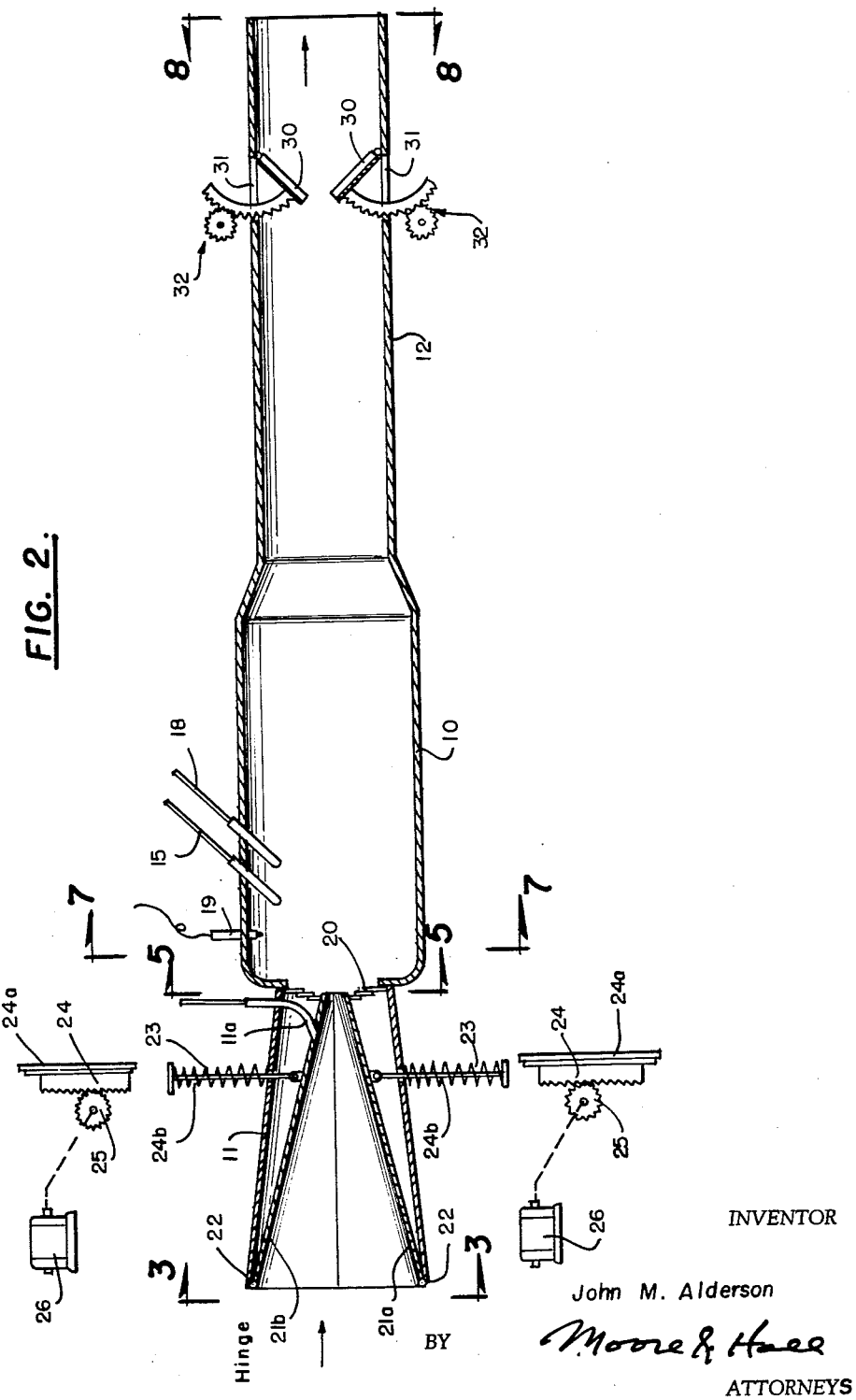
FIGURE 2 is a cross-sectional view of the device.
Figure 3:
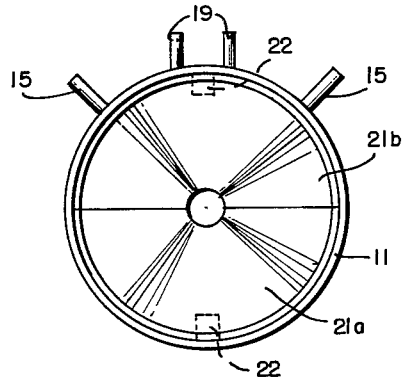
FIGURE 3 is a front view taken along line 3—3 of FIGURE 2.
Figure 4:
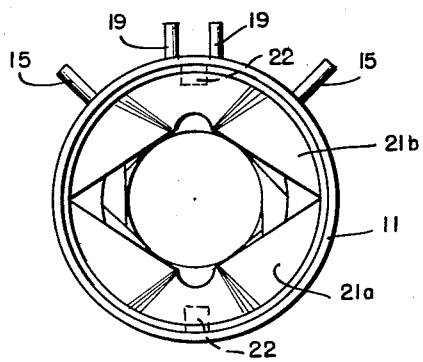
FIGURE 4 is a front view also taken along line 3—3 of FIGURE 2, but after the cone and lens have opened wide.
Figure 5:
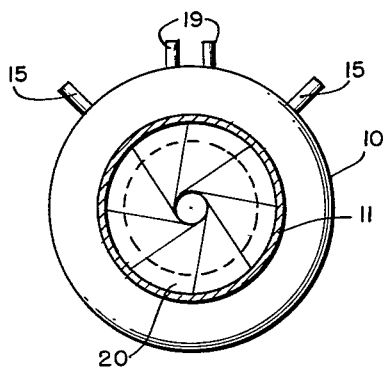
FIGURE 5 is a sectional view along line 5—5 of FIGURE 2, showing the lens in its closed position.
Figure 6:
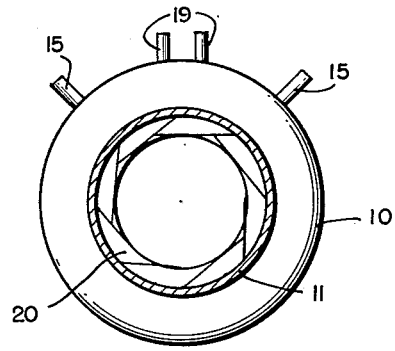
FIGURE 6 is also a sectional view along line 5—5 of FIGURE 2, but showing the lens in its wide open position.
Figure 7:
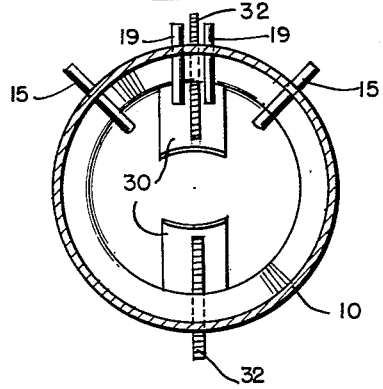
FIGURE 7 is a sectional view taken along line 7—7 of FIGURE 2.
Figure 8:
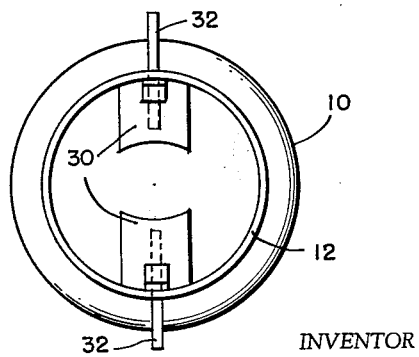
FIGURE 8 is a rear view taken along line 8—8 of FIGURE 2.

As shown in FIGURE 2, the forward end of the combustion chamber 10 terminates in an iris diaphragm 20 having a central orifice through which air may enter the combustion chamber. The size of the orifice is controlled by an inner cone which comprises two pieces 21a and 21b as shown in FIGURES 2, 3, and 4. Each piece is pivoted at its left-hand or forward end 22. Suitable springs 23 bias the inner cone pieces 21a and 21b to the position shown in FIGURES 2 and 3, tending to reduce to a minimum the size of the orifice leading from the cone to the combustion chamber. By means of a rack 24 which travels on a track 24a, a pinion 25 and an electric motor 26, each part of the cone may be forcibly closed, as will appear. The small end of the cone 21a–21b is attached to the iris diaphragm 20 so that when the cone 21a–21b is opened and closed, the iris diaphragm is automatically also opened and closed.

When the aircraft is at rest and it is desired to start the same, the pilot will ignite the fuel from the nozzle 18 and supply compressed air through nozzle 15. In view of the fact that the iris diaphragm 20 is largely closed, the products of combustion will be exhausted by way of the tail pipe 12 and will exert a forward pressure on iris diaphragm 20, tending to move the craft forward. As the forward speed increases, the force of the incoming air impinging upon inner cone 21a–21b will force the two parts of the cone to rotate about their hinges 22 whereby the trailing ends of these pieces separate, as shown in FIGURE 4, against the tension of springs 23, until finally at maximum operating speed the iris diaphragm is wide open and the inner cone 21a–21b has moved into a position substantially adjacent outer cone 11. This reduces the area at the forward end of the combustion chamber available for thrust. After the craft has acquired sufficient speed to sustain operation without air from reservoir 14, the pilot will fully close valve 14a.

If during flight there should be a flame-out, whereby the pilot should desire to ignite the engine a second time, he may do so by energizing motors 26 to forcibly close the inner cone 21a–21b and the iris diaphragm 20, restoring these parts to the position shown in FIGURE 2. The energization of motors 26 moves racks 24 inwardly and presses the rods 24b inwardly until the inner cone and the iris diaphragm are closed. When this condition has been achieved the pilot may again ignite the fuel by energization of the spark plugs 19.

In normal flight the deflector plates 30 in tail pipe 12 cover holes 31 so that the entire cross-section of the tail pipe is unobstructed. When it is desired to decrease the speed of the craft, as, for example, preparatory to landing, the baffles 30 are deflected by means of gears 32 to the position shown in FIGURE 2 so as to deflect the burnt gases out of side holes 31 instead of out of the rear end of tail pipe 12.

The advantage of using my ram jet engine instead of a conventional ram jet engine on a craft, is that adequate thrust is available for starting and take-off. Moreover, the power available once the craft is in motion is much greater than is available with the conventional jet engine since the large compressor and turbine of the conventional jet are not required. My engine is much smaller and lighter in weight than other known aircraft engines. However, it must be remembered that the invention is not limited to use in aircraft but may be employed in any suitable situation.

I claim to have invented:

1. A ram jet engine comprising a combustion chamber, means for feeding fuel to said combustion chamber, means for igniting the fuel, and means at the forward end of the combustion chamber for providing an air entrance opening during starting of the engine and a larger size of air entrance opening during running of the engine and a thrust receiving area at the forward end of the combustion chamber for receiving thrust during starting which becomes smaller during running of the engine, said last-named means including means responsive to the ram effect of air on the engine for varying said areas.

2. A ram jet engine comprising a combustion chamber; means for feeding fuel to the combustion chamber; means for igniting the fuel; and air intake and thrust receiving means at the forward end of the combustion chamber, responsive to force of impact of the air flow through the engine, for automatically decreasing the thrust receiving area while increasing the size of the air inlet as the velocity of air flow through the engine increases.

3. A ram jet engine comprising a combustion chamber having a thrust receiving area, means for feeding fuel to said chamber, and means at the forward end of the combustion chamber for providing an air inlet to the combustion chamber, said second-named means including means operated by the air flowing through said inlet for decreasing the thrust receiving area of said combustion chamber while enlarging the air inlet opening to the combustion chamber as the velocity of said air increases.

4. A ram jet engine comprising a combustion chamber; means for feeding fuel to said chamber, funnel means having a large end projecting forwardly of the combustion chamber and a small end communicating with said combustion chamber for scooping air and feeding it to said combustion chamber, said funnel means including means for enlarging the opening at the small end of the funnel means when the air pressure on the funnel means increases.

5. A ram jet engine comprising a combustion chamber, means for feeding fuel to said chamber, funnel means at the forward end of said chamber for scooping air into said chamber, said funnel means having a large end for scooping air and a small end communicating with said combustion chamber said funnel means being in two parts, and supporting means for said parts to permit them to separate under pressure of the scooped air to enlarge the opening at the small end of the funnel means to thus increase the air flow into the combustion chamber.

6. A ram jet engine as defined in claim 5 having an iris diaphragm at the forward end of the combustion chamber to receive at least part of the thrust, said iris diaphragm being connected to said funnel means so that as the two parts of the latter separate the iris diaphragm is opened wider.

7. A ram jet engine comprising a combustion chamber, means for feeding fuel to said chamber, an iris diaphragm across the forward end of said chamber to vary the thrust-receiving area thereof as well as the size of the opening into the chamber, and automatic means responsive to ram pressure for gradually increasing the size of the opening in the iris diaphragm as the speed of the engine increases.

8. A ram jet engine comprising a combustion chamber, means for feeding fuel to said chamber, means providing a variable area air inlet at the forward end of said chamber including scoop means for increasing said area as the velocity of air at the scoop increases, and means for overriding the scoop means to at least partly reduce said area of the air inlet.

9. A ram jet engine as defined in claim 8 in which the last-named means comprises manually controlled motor means.

10. A ram jet engine comprising a combustion chamber, means for feeding fuel to said chamber, means for igniting the fuel, an iris diaphragm at the forward end of said chamber, said iris diaphragm having a central opening therein, funnel shaped scoop means forward of the iris diaphragm for scooping air and directing it through the opening in the lens, said scoop means being in two parts which are forced apart by the pressure of the air on the scoop means to thus increase the area at the small end of the scoop means, biasing means for biasing the two parts of the scoop means toward each other to provide reduced area at the small end of the scoop means when no air is flowing through the scoop means, said scoop means being connected to the iris diaphragm to open the latter as the parts of the scoop means move apart.

11. A ram jet engine as defined in claim 10 having means for forcibly moving the two parts of the scoop means together to partly close the opening into the combustion chamber to permit reignition after flame-out.

12. A ram jet engine comprising a combustion chamber, means for feeding fuel to said chamber, an iris diaphragm across the forward end of said chamber to vary the thrust-receiving area thereof as well as the size of the opening into said chamber, and automatic means responsive to the ram pressure due to forward movement of the engine for increasing the size of the opening in the iris diaphragm when the ram pressure increases and decreasing the size of the opening in the iris diaphragm when the ram pressure decreases.

References Cited in the file of this patent

UNITED STATES PATENTS

| | | |
|---|---|---|
| 2,446,266 | Cummings | Aug. 3, 1948 |
| 2,681,548 | Kappus | June 22, 1954 |
| 2,840,322 | Griffith | June 24, 1958 |
| 3,019,600 | Peek | Feb. 6, 1962 |

FOREIGN PATENTS

| | | |
|---|---|---|
| 800,871 | Great Britain | Sept. 3, 1958 |